United States Patent
Turner

(10) Patent No.: US 9,507,512 B1
(45) Date of Patent: Nov. 29, 2016

(54) USING GESTURES TO DELIVER CONTENT TO PREDEFINED DESTINATIONS

(75) Inventor: Andrew Russell Turner, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 363 days.

(21) Appl. No.: 13/456,036

(22) Filed: Apr. 25, 2012

(51) Int. Cl.
*G06F 3/01* (2006.01)
*G06F 3/0488* (2013.01)
*G06F 3/00* (2006.01)

(52) U.S. Cl.
CPC ................................. *G06F 3/04883* (2013.01)

(58) Field of Classification Search
USPC .................. 715/846, 768, 863; 345/156, 173
See application file for complete search history.

(56) References Cited

U.S. PATENT DOCUMENTS

| | | | |
|---|---|---|---|
| 8,464,184 B1* | 6/2013 | Cook et al. .................... | 715/863 |
| 8,490,002 B2* | 7/2013 | Fai ................................ | 715/753 |
| 8,750,802 B2* | 6/2014 | Matsubara et al. ........... | 455/41.3 |
| 2009/0021495 A1* | 1/2009 | Edgecomb et al. .......... | 345/179 |
| 2009/0058820 A1* | 3/2009 | Hinckley ....................... | 345/173 |
| 2009/0100383 A1 | 4/2009 | Sunday et al. | |
| 2009/0244015 A1* | 10/2009 | Sengupta et al. ............. | 345/173 |
| 2010/0115473 A1 | 5/2010 | Reeves et al. | |
| 2010/0306698 A1 | 12/2010 | Sellers et al. | |
| 2011/0016422 A1* | 1/2011 | Miyazawa et al. ........... | 715/788 |
| 2011/0029934 A1 | 2/2011 | Locker et al. | |
| 2011/0066619 A1 | 3/2011 | Perantatos et al. | |
| 2011/0083111 A1* | 4/2011 | Forutanpour et al. ........ | 715/863 |
| 2011/0109561 A1 | 5/2011 | Lee et al. | |
| 2011/0118877 A1 | 5/2011 | Hwang et al. | |
| 2011/0126135 A1* | 5/2011 | Chambers et al. ........... | 715/763 |
| 2011/0163944 A1* | 7/2011 | Bilbrey et al. ................ | 345/156 |
| 2011/0265002 A1 | 10/2011 | Hong et al. | |
| 2011/0296308 A1* | 12/2011 | Yi ................................. | 715/733 |
| 2011/0298701 A1 | 12/2011 | Holzer et al. | |
| 2011/0302515 A1 | 12/2011 | Kim | |
| 2012/0011462 A1 | 1/2012 | Westerman et al. | |
| 2012/0030623 A1 | 2/2012 | Hoellwarth | |
| 2012/0038625 A1* | 2/2012 | Kim .............................. | 345/419 |
| 2012/0084670 A1* | 4/2012 | Momchilov ................... | 715/753 |
| 2012/0084694 A1* | 4/2012 | Sirpal et al. .................. | 715/769 |
| 2012/0131458 A1* | 5/2012 | Hayes ........................... | 715/716 |
| 2012/0157203 A1* | 6/2012 | Latta et al. .................... | 463/32 |
| 2012/0179970 A1 | 7/2012 | Hayes | |
| 2012/0188164 A1* | 7/2012 | Dey et al. ..................... | 345/163 |
| 2012/0192117 A1 | 7/2012 | Migos et al. | |
| 2012/0206382 A1 | 8/2012 | Kusano | |
| 2012/0218196 A1 | 8/2012 | Lv et al. | |
| 2012/0235912 A1 | 9/2012 | Laubach | |
| 2012/0235930 A1 | 9/2012 | Lazaridis et al. | |
| 2012/0242702 A1 | 9/2012 | Sirpal et al. | |

(Continued)

*Primary Examiner* — Toan Vu
(74) *Attorney, Agent, or Firm* — Thomas | Horstemeyer LLP; Michael J. D'Aurelio; Jason M. Perilla

(57) ABSTRACT

Disclosed are various embodiments for using gestures to deliver content to predefined destinations. After a user designates a content item, a flick gesture is detected, where the flick gesture has a point of origin and crosses a trip line surrounding the point of origin. A destination associated with the flick gesture is identified from a plurality of predefined destinations. Each predefined destination is associated with a region in a predefined plurality of display regions. The content item is delivered to the determined destination.

22 Claims, 17 Drawing Sheets

(56) References Cited

U.S. PATENT DOCUMENTS

| | | |
|---|---|---|
| 2012/0272157 A1* | 10/2012 | Tajima et al. ............... 715/748 |
| 2012/0290946 A1 | 11/2012 | Schrock et al. |
| 2013/0019173 A1 | 1/2013 | Kotler et al. |
| 2013/0074014 A1 | 3/2013 | Ouyang et al. |
| 2013/0097566 A1 | 4/2013 | Berglund |
| 2013/0132883 A1 | 5/2013 | Vayrynen |
| 2013/0132904 A1* | 5/2013 | Primiani et al. ............... 715/834 |
| 2013/0145295 A1 | 6/2013 | Bocking et al. |
| 2013/0151665 A1* | 6/2013 | Maddali et al. ............... 709/218 |
| 2013/0263029 A1* | 10/2013 | Rossi et al. ............... 715/764 |
| 2014/0040766 A1* | 2/2014 | Shigeta et al. ............... 715/748 |
| 2014/0101566 A1* | 4/2014 | Mulloy et al. ............... 715/748 |

* cited by examiner

USING GESTURES TO DELIVER CONTENT TO PREDEFINED DESTINATIONS

BACKGROUND

Many computing devices now include a gesture user interface that allows the user to interact with applications executing on the device through gestures. Gesturing can be particularly useful when the size of the device would make a keyboard inconvenient or impractical.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments described herein relate to the use of gesturing to simplify the delivery of content. The embodiments may be implemented on a mobile or handheld computing device with a touchscreen, although other types of computing devices, displays, and input devices may also be utilized. In some embodiments, regions or areas of the touchscreen are associated with predefined destinations, and a type of gesture referred to herein as a "flick gesture" is used to deliver selected items of content to one of these destinations. These destinations may include folders on the device, email addresses, social networking sites, other computing devices, and as any other type of destination which the computing device can access. The selected items may include files, documents, images, video, audio, web pages, messages, and other types of content.

The flick gesture itself specifies the destination for the selected content. As one example, flicking toward the left side of the display may create an email message to a particular contact and insert the selected image as an attachment. As another example, flicking toward the right side of the display may post selected text to a Twitter® account.

In other embodiments, the display regions or areas are associated with different clipboards. Content items can be selected then aggregated or accumulated into a particular clipboard using a flick gesture. For example, flicking toward the top edge of the display may add the selected item to a "family" clipboard while flicking toward the bottom edge of the display may add the selected item to a "my blog" clipboard. After one or more items have been aggregated, the user can interact with application(s) to set up delivery of the aggregated content, and then perform an insert gesture which instructs the application(s) to deliver the aggregated content. The insert gesture may be, for example, an off-screen swipe from one of the edges toward an application.

As one example of this aggregation operation, the user may navigate, using the browser, to a page on a photo sharing site that is visible to family members. The user may then perform an off-screen swipe from the bottom clipboard region. The aggregated photos from the "family" clipboard are then posted to the photo sharing site on the family page. The user may then navigate using the browser to a page for creating a new blog post, perform an off-screen swipe from the top clipboard region. The aggregated files from the "my blog" folder are then copied into the new blog post.

Though specific examples of content, destinations, and gestures are discussed herein, it will be understood that other types may be used as well. In the following discussion, a general description of the system and its components is provided, followed by a discussion of the operation of the same.

Figure 1:
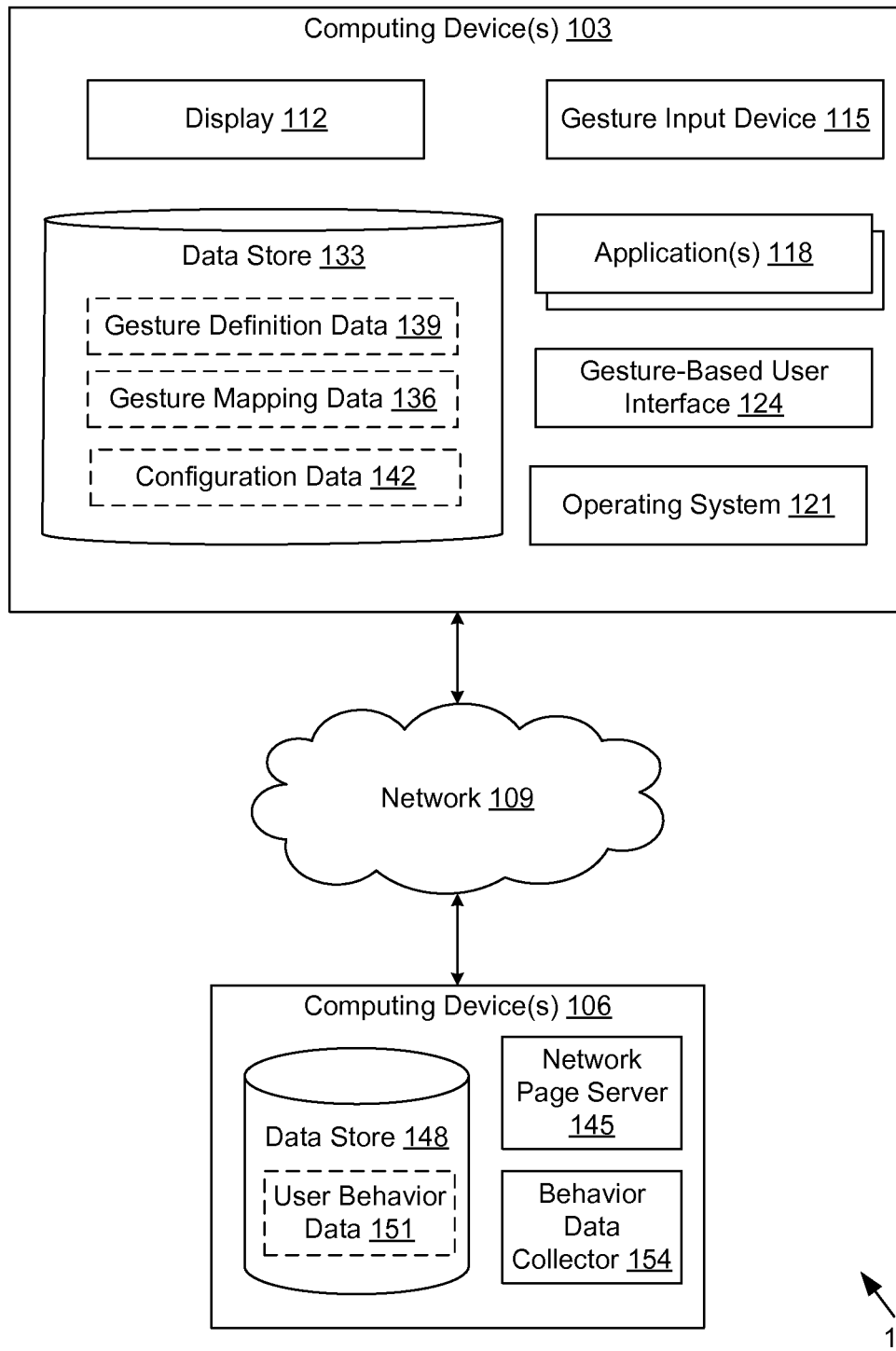
FIG. 1 is a drawing of a networked environment according to one embodiment of the present disclosure.

With reference to FIG. 1, shown is a networked environment 100 according to various embodiments. The networked environment 100 includes one or more computing devices 103 in data communication with one or more computing devices 106 by way of a network 109. The network 109 includes, for example, the Internet, intranets, extranets, wide area networks (WANs), local area networks (LANs), wired networks, wireless networks, or other suitable networks, or any combination of two or more such networks.

The computing device 103 may comprise, for example, a processor-based system such as a computer system. Such a computer system may be embodied in the form of a mobile phone, a web pad, a tablet computer system, a notebook computer, a personal digital assistant, a game console, an electronic book reader, a set-top box, a television, a music player, a video player, a media player, a desktop computer, or other devices with like capability. The computing device 103 includes a display 112 and a gesture input device 115. The display 112 may take the form of a cathode ray tube display, a liquid crystal display (LCD) screens, a gas plasma-based flat panel display, or other types of display.

The gesture input device 115 allows a user to input gestures such as drags, drops, taps, tap-and-holds, swipes, slides, scrolls, flicks, pinches, etc. In some embodiments, the gesture input device 115 includes a motion sensing capability, which allows the user to interact with and manipulate items on the screen via gesture recognition and pointing. The gesture input device 115 may, for example, use an accelerometer and/or optical sensors.

In some embodiments, a touchscreen may combine the functions of the display 112 and the gesture input device 115. The touchscreen may use, for example, capacitive technology, resistive technology, or some other technology. The computing device 103 may also include other input devices such as a keyboard, touch pad, touch stick, mouse, joystick, game controller, button, etc.

In some embodiments, the computing device 103 may incorporate three-dimensional and/or haptic technologies. For example, the display 112 may be a stereoscopic display, a three-dimensional composite display, a holographic projection display, etc. The gesture input device 115 may be a haptic device having an output section which provides feedback to the user. Examples of such haptic feedback include vibration devices, buzzing devices, audio devices, indicator lights, seven-segment display devices, and so on.

The computing device 103 may be configured to execute one or more applications 118, an operating system 121, a gesture-based user interface 124, and various other components. The applications 118 may include, but are not limited to, productivity tools (e.g., email, calendar, contact databases, word processing, and so on), browsers, media players, games, location-based applications, and electronic commerce applications. When the computing device 103 is a mobile device, such applications 118 may be referred to as "apps." The applications 118 may access the network 109 and may interoperate with other applications 118 and/or with computing devices 106. The applications 118 may be downloadable from a computing device 106 via the network 109. The applications 118 may be purchased or available for free.

The gesture-based user interface 124 allows a user to interact with the applications 118 through gestures such as drags, drops, taps, tap-and-holds, swipes, slides, scrolls, flicks, pinches, etc. Multi-touch gestures may also be supported. The user makes these gestures using the gesture input device 115. The gesture-based user interface 124 supports a flick gesture which allows a user to select an item of content (e.g., file, image, etc.) and deliver the selected item to one of a set of predefined destinations, each associated with a region of the display 112. In other words, the user can select an item and flick toward a region of the display 112, and the gesture-based user interface 124 delivers the selected item to a destination that is associated with that region. Various types of destinations and delivery may be supported, for example, message delivery to email or instant message contacts, saving of files to a folder stored on the computing device 103, posting the item to a social networking site, sending the item to another computing device 106, and so on.

The gesture-based user interface 124 may make use of services provided by the operating system 121, which may in turn use one or more device drivers to interface with the gesture input device 115 and the display 112. For example, the operating system 121 may notify the gesture-based user interface 124 of touchscreen events, mouse events, keyboard events, etc. The operating system 121 may also provide services which allow components such as the gesture-based user interface 124 to render or draw on the display 112.

The computing device 103 may also comprise a data store 133 which stores various types of data, including those used by the gesture-based user interface 124. The data store 133 includes, for example, gesture mapping data 136, gesture definition data 139, and configuration data 142. The gesture-based user interface 124 and/or the operating system 121 use the gesture definition data 139 to detect various gestures and to distinguish between them (e.g., a swipe vs. a scroll, a slide vs. a flick, etc.). The gesture-based user interface 124 uses the gesture mapping data 136 to map between regions of the display 112 and various destinations and/or clipboards. The configuration data 142 stores various settings which control the behavior of the gesture-based user interface 124.

Having discussed the computing device 103, the computing device 106 will now be described. The computing device 106 may comprise, for example, a server computer or any other system providing computing capability. Various applications and/or other functionality may be executed in the computing device 106 according to various embodiments. The computing device 106 may also include a data store 148 which stores various types of data, for example, user behavior data 151. The components executed on the computing device 106 may include a network page server 145, which may be implemented as a commercially available hypertext transfer protocol (HTTP) server such as, for example, Apache® HTTP Server, Microsoft® Internet Information Services (IIS), and other servers. In some embodiments, the components executed on the computing device 106 may also include a gesture data collector 154.

In such embodiments, the gesture data collector 154 operates to collect data from the gesture-based user interface 124 that is executing on the computing device 103. As the user interacts with the user interface 124, information about the user's behavior is provided to the collector 148. For example, the collector 148 may obtain data describing the flick gestures made by the user, the destinations and/or clipboards with which the user interacts, the applications with which the user interacts, and the network sites with which the user interacts. The collector 148 may process this data to make recommendations as to which destinations, clipboards, and/or applications the user may wish to target with a flick gesture. The collector may recommend based on the aggregate behavior data collected from multiple users. For example, if multiple users are visiting a particular social networking site, then collector 154 may communicate that social networking site to the gesture-based user interface 124 along with a recommendation that the site be associated with the flick gesture destination. The collector 154 may make a recommendation for a user based solely on the behavior of that particular user, and in such embodiments, the collector 124 and user behavior data 151 may be stored locally at the computing device 103 rather than at the network-accessible computing device 106.

A general description of the operation of the various components of the networked environment 100 is provided. Each of FIGS. 2A-F depicts a user interface 200 shown on the display 112 (FIG. 1) of the computing device 103 (FIG. 1). As will be described herein, the gesture-based user interface 124 (FIG. 1) allows the user to designate a particular content item 203 to be sent to one of a set of predefined destinations such as folders, contacts, network sites, etc., and then to indicate the particular destination by means of a flick gesture.

The gesture-based user interface 124 may provide a configuration option which allows the user to specify these destinations and the association between destinations and regions of the display 112. For example, the user may define a destination in terms of an application (e.g., file explorer, email, browser, etc.) and/or a location (e.g., folder, email contact, network site, etc.). In some embodiments, the user may view the destinations in a hierarchy (e.g., Contacts, Social Networking Sites, Folders, and Devices). Each of these top level groups may have groups underneath (e.g., Twitter, Facebook, StumbleUpon, etc.), with and multiple levels may be supported (e.g., Jane's Facebook, Bob's Facebook, etc.). The gesture-based user interface 124 may provide a configuration interface which allows the user to specify these various configuration options, which are then stored as configuration data 142.

The gesturing described herein provides a simple mechanism for a user to designate a content item 203, to identify a destination that corresponds to a display region, and to easily deliver the designated content item 203 to the destination. The user interfaces 200 shown in FIGS. 2A-2F illustrate an example of this process of designating a content item 203, identifying a destination for the content item 203, and causing the gesture-based user interface 124 to send the designated content item 203 to the identified destination.

Figure 2A:
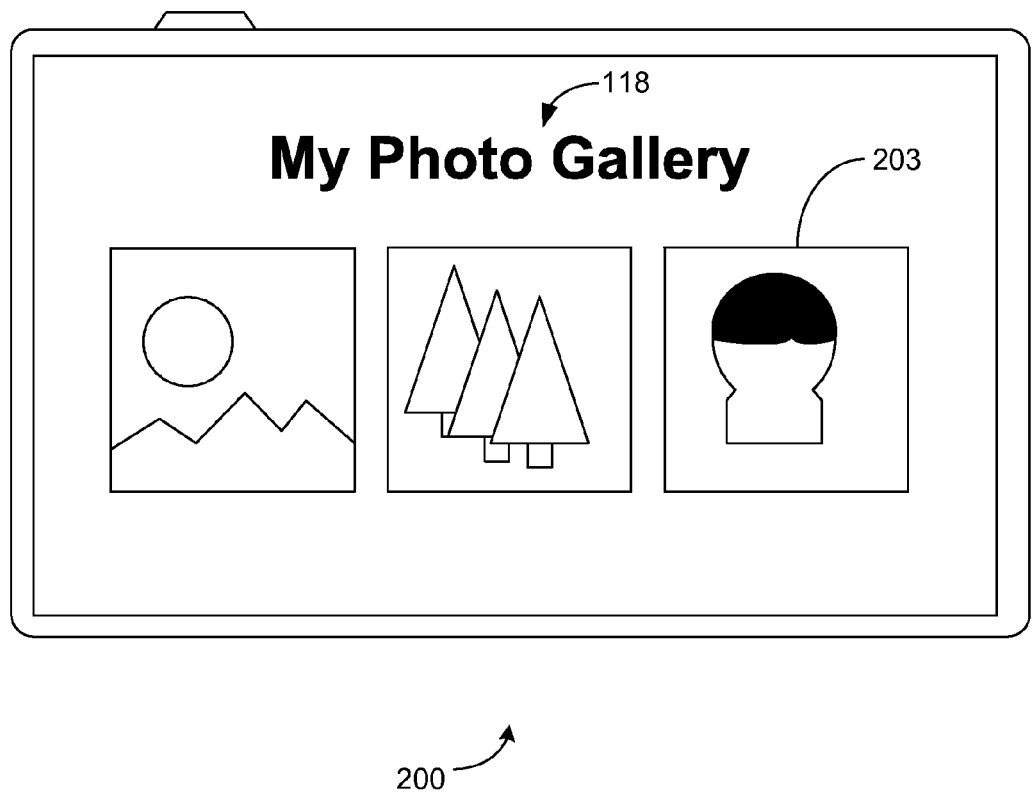
FIGS. 2A-2G are examples of a user interface displayed on a computing device employed in the networked environment of FIG. 1 according to various embodiments of the present disclosure.

As shown in FIG. 2A, a user interacts with an application 118 (FIG. 1) through the gesture-based user interface 124 (FIG. 1) to view, browse, navigate, or otherwise interact with one or more content items 203. The content item 203 may comprise, for example, a file, a folder, a document, a network page, an image, a video, an audio file, an email message, etc. In the example of FIG. 2A, the content items 203 take the form of photos displayed by a photo gallery application 118. The user interface 200 may visually represent the content items 203 with icons. For some types of content items 203, each icon is a thumbnail, or smaller representation, of the actual content. For content items 203, the icon may instead represent the type of content. For example, the icon for a text document may be shown as a sheet of paper, the icon for a subdirectory in a file system may be shown as a folder, etc. In the example of FIG. 2A, the content items 203 are arranged in a grid. However, other arrangements of multiple content items 203 are possible.

Figure 2B:
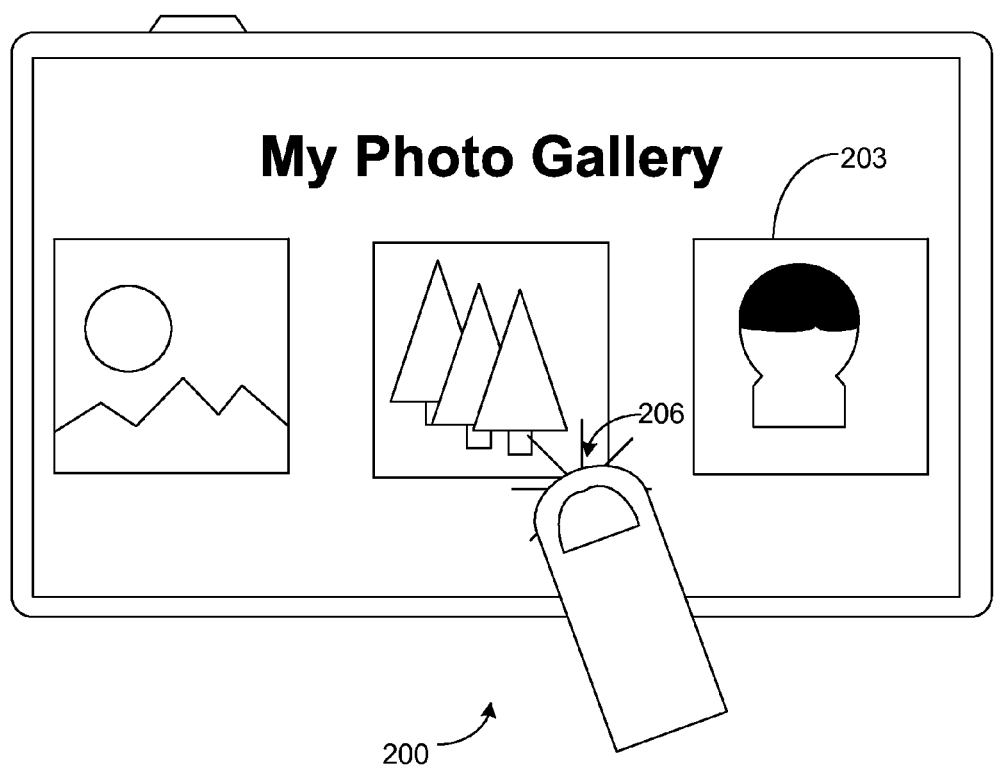

Turning now to FIG. 2B, the user begins the process of sending a content item 203 to a particular predefined destination by performing a gesture which designates a particular content item 203 as one intended for a predefined destination. In the example user interface of FIG. 2A, the gesture used to designate is a tap-and-hold gesture at location 206 on the display 112. For a tap and hold gesture, the user touches one of the content items 203 at a particular screen location 206 and continues to touch for some predefined period of time. The touch may take the form of a physical touch or may take the form of clicking the mouse button, for example, in which case the hold might correspond to holding the mouse button for the predefined period.

Figure 2C:
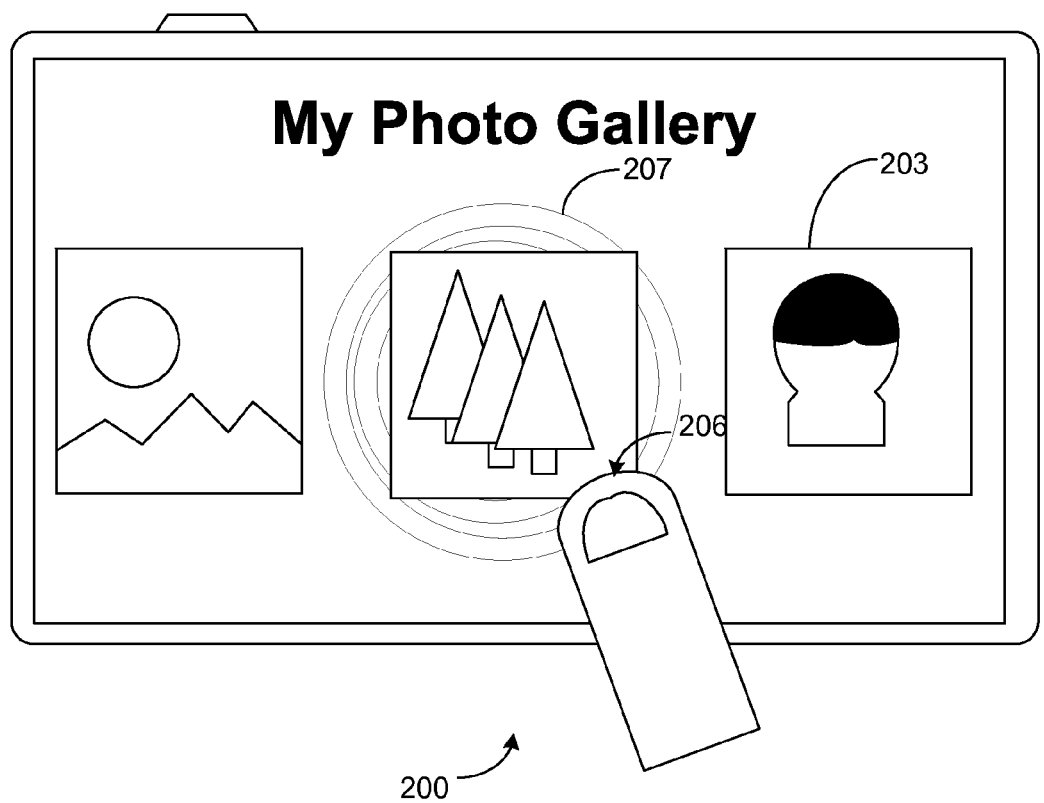

The gesture-based user interface 124 may provide a visual and/or audio indication that the content item 203 has been designated. FIG. 2C illustrates one example of such an indication, in which the icon for the content item 203 begins flashing (suggested by circular region 207). As another example, the icon for the content item 203 may be animated in some way to show movement. As yet another example, the gesture-based user interface 124 may use a tone or sound to alert the user that the content item 203 has been designated. The gesture-based user interface 124 may support more than one type of indication and allow the user to choose between them via a configuration interface, where the gesture-based user interface 124 stores the user's choices as configuration data 142. Finally, although the designation of a content item 203 described in connection with FIG. 2B involves selecting one item from multiple items, the user may also select a single content item 203 when that item is the only content item 203 shown.

Once the user has designated a content item 203, or a portion of a content item 203, to send to a destination, the user then uses a specific gesture to identify which destination among of a set of predefined destinations. This gesture is referred to herein as a "flick gesture." Destinations may correspond, for example, to folders, email or phone contacts, social networking sites, blogs, note-taking sites, media sharing sites, etc.

Figure 2D:
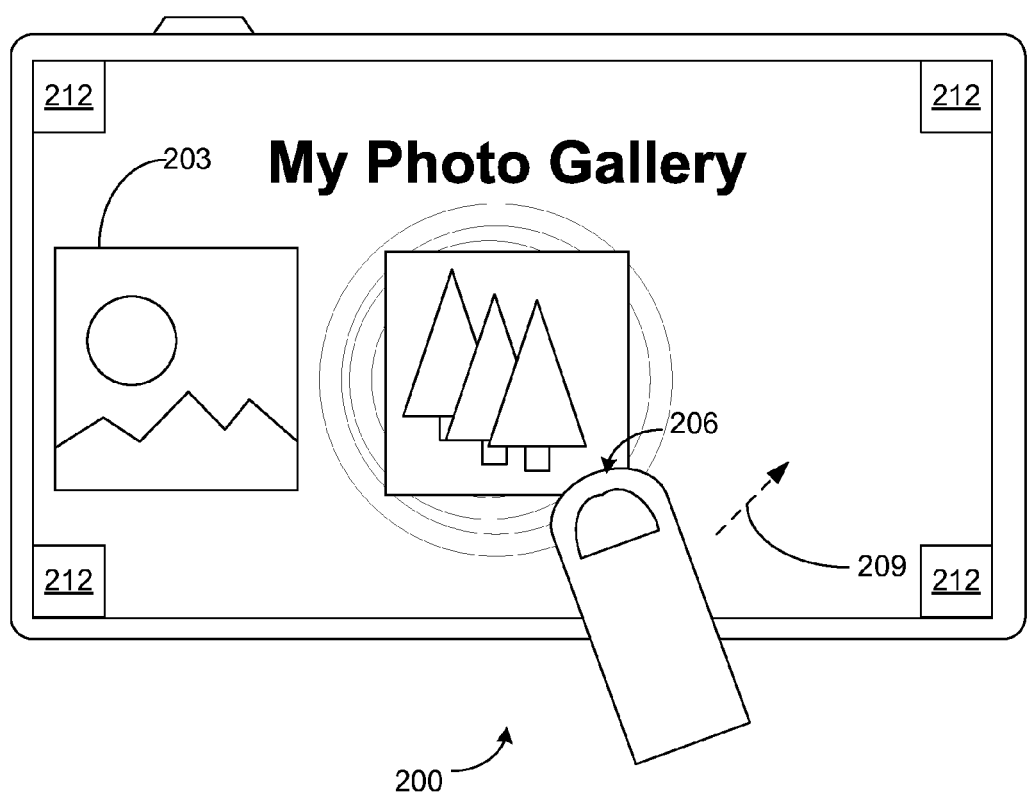

Referring now to FIG. 2D, each predefined destination for the content item 203 is associated with a particular region 212 of the display 112. By gesturing toward one of these predefined regions 212, the user instructs the gesture-based user interface 124 to send the designated content item 203 to the destination associated with this region 212. Thus, a user can quickly send a photo to his friend via an email message, or can quickly save a document to a particular folder, by performing a gesture that identifies the friend, folder, etc. The user may define these destinations and associate the destinations with regions 212 via a configuration interface, where the gesture-based user interface 124 stores these settings as configuration data 142.

User designation of a content item 203 for sending to a destination causes the gesture-based user interface 124 to change state and look for a flick gesture that identifies one of a set of predefined destinations. As shown in FIG. 2D, a flick gesture involves a touch at a point of origin 206 followed by movement 209 toward one of a set of predefined regions 212 of the display 112. Since a flick gesture involves a touch and move, a flick gesture can be described by a point of origin 206 and movement 209, along a track, toward a region 212.

The display 112 may be divided into any number of regions 212. The regions 212 may comprise only a subset of the display 112. For example, in the example embodiment shown in FIG. 2D, the display 112 is divided into four regions 212, one for each edge of a rectangular display 112. In another embodiment, the display 112 is divided into four regions 212, one for each corner of a rectangular display 112. In other embodiments, the entire display 112 may be divided into some number of rectangular regions 212 which form a grid. In still other embodiments, the regions 212 have a shape that is other than rectangular.

In some embodiments that incorporate three-dimensional display and/or input technologies, the regions 212 are arranged in three-dimensional space. For example, rather than a two-dimensional grid of regions 212 on the screen, the flick gesture destinations may correspond to a three-dimensional grid of regions 212 in space. While various embodiments described herein involve regions 212 laid out in a linear grid, non-linear arrangements are also possible.

The gesture-based user interface 124 may use the distance from the point of origin 206 to determine that the flick gesture has identified a particular delivery destination. That is, the gesture-based user interface 124 may utilize a "tripline" at a predetermined distance from the point of origin 206, and consider any movement 209 past this tripline to be an indication that a particular region 212, and thus a particular destination, has been chosen. For example, consider a scenario in which the predefined destinations are associated with the four edges of a rectangular display 112. The gesture-based user interface 124 may detect when the track of a flick gesture extends more than an inch in any direction, and further determine which region 212 lies in this direction. In such a scenario, the gesture-based user interface 124 may determine that the user has selected this region 212 and the predefined destination associated with this region 212 as the destination for content delivery.

In addition to including a point of origin 206, the flick gesture is also described in terms of velocity and/or acceleration, that is, how quickly the user moves from the point of origin 206 toward the destination region 212. The flick gesture may be distinguished in this respect from other gestures such as swipe or scroll, in that the flick gesture involves a faster or jerkier movement than does a swipe or scroll. In some embodiments, the flick gesture may therefore be detected by a touch and hold for a first predefined threshold period, followed by a movement 209 having a velocity or acceleration exceeding a second predefined threshold period.

In some embodiments, the final destination of the flick gesture depends on the velocity and/or acceleration of the flick. For example, a relatively low speed flick gesture may indicate a destination that is relatively close to the center of origin of the flick gesture while a relatively high speed flick gesture may indicate a destination that is farther away from the center of origin. This behavior may be viewed as involving a frictional component, such that a faster or jerkier motion overcomes the friction and thus "lands" farther away, while a slower or smoother motion does not overcome the friction and thus "lands" closer to the point of origin.

Some forms of the flick gesture involve a tap at a point of origin followed by a move in a single direction. In other scenarios, a user may tap at a point of origin and then move in a first direction, then in a second direction, and so on, before finally completing the gesture by lifting the finger off the screen. Such a flick gesture thus involves more than a tap followed by a move toward a single destination or region 212 of the screen, as the user's finger moves toward several different screen regions 212 before the flick gesture is complete. In such scenarios, the gesture-based user interface 124 may derive movement toward a particular final screen region 212 by computing a vector or trajectory based on the last direction, or based on the last N points over which the user's finger traveled, or some combination thereof.

The flick gesture may be distinguished in another respect from other gestures such as swipe or scroll, in that the track of the flick gesture may be shorter than the track of a swipe or scroll. That is, a user making a flick gesture may touch the display 112 and then move his finger for a relatively small distance, such as an inch or less, whereas a swipe or scroll may be a much larger motion, on the order of several inches or more. Therefore, in some embodiments, the flick gesture may be detected by a touch at a point of origin 206, a hold at this point of origin 206 for a first predefined threshold period, followed by movement 209 to a second point, where the distance between the first and second points is under a second predefined threshold.

The flick gesture is also distinguishable from a drag-and-drop gesture in that a drag-and-drop requires the user to move all the way to the destination. For example, inserting a file into a folder via a drag-and-drop requires the user to move all the way to the folder. In contrast, the flick gesture is a move toward a destination, and does not require the motion to complete at the destination.

Some embodiments of the gesture-based user interface 124 provide a visual representation of the set of predefined destinations and their association with the display regions 212. This visual indication may appear, for example, after the user has designated content so as to remind the user what his options are for the different predefined destinations. The gesture-based user interface 124 may support more than one type of indication and allow the user to choose between them via a configuration interface, where the gesture-based user interface 124 stores the user's choices as configuration data 142.

Figure 2E:
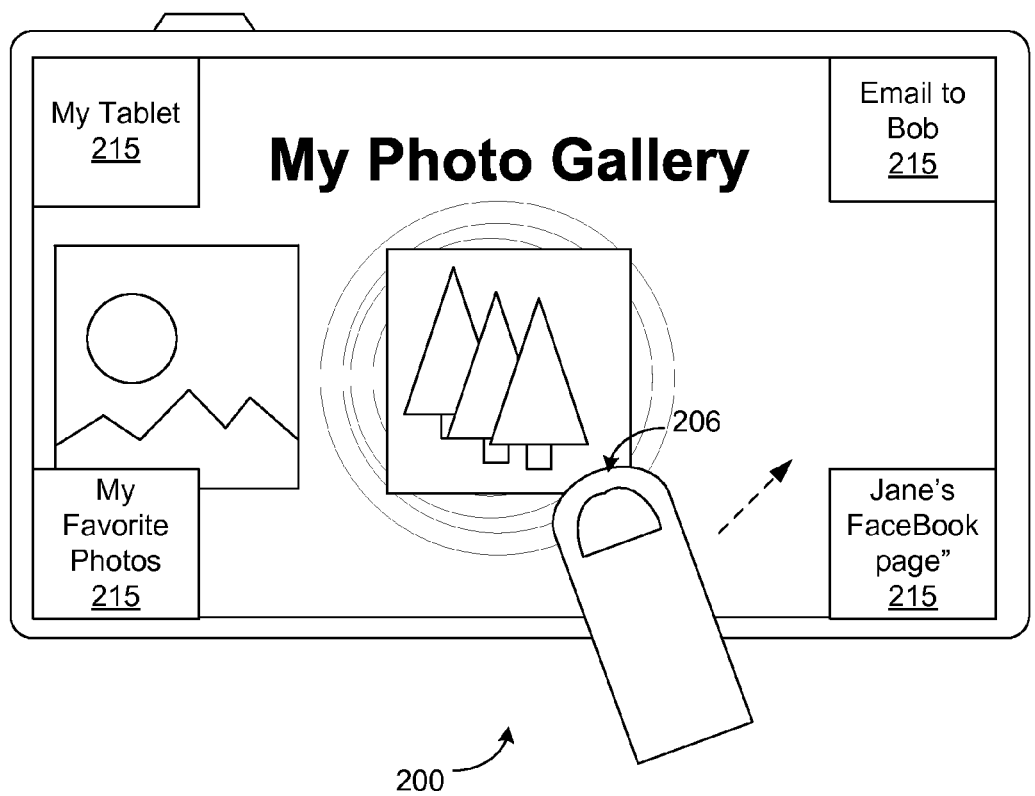

An example of one such representation is shown in FIG. 2E, where the gesture-based user interface 124 displays a set of labels 215 within each of the various regions 212. Each label 215 includes text with the name of the destination. In the embodiment of FIG. 2E, the regions 212 correspond to the edges of the screen, and are labeled: "Email to Bob"; "Jane's FaceBook page"; "My Favorite Photos"; and "My Tablet." These labels 215 may appear when the gesture-based user interface 124 has designated a content item 203. The labels 215 may be visually distinguished by a highlight, transparency, flashing, or some other mechanism for drawing the user's attention to the labels 215. The user may define the text of the labels 215 via a configuration interface, or the gesture-based user interface 124 may derive the text from the corresponding destination.

Figure 2F:
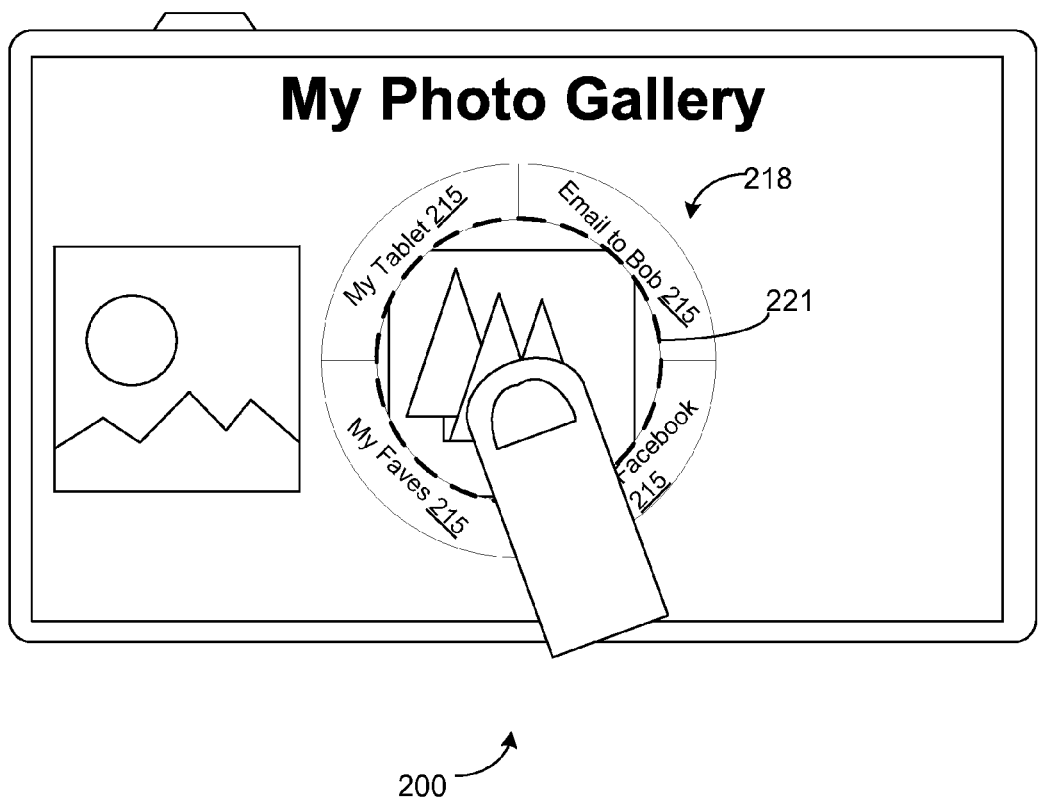

FIG. 2F shows another visual representation of the set of predefined destinations and their association with the display regions 212. In this embodiment, the gesture-based user interface 124 displays a circular arrangement 218 of labels, centered approximately at the point of origin 206 of the flick gesture. These labels 215 may appear as highlighted or transparent so as not to interfere with other objects appearing in the same area of the display 112. The circular arrangement 218 may appear, for example, when the user has designated a content item 203. Such a circular arrangement 218 also provides a visual indication of the trip line 221 surrounding the point of origin 206. Thus, by seeing the circular arrangement 218, the user knows how far the flick gesture should extend in order to "trip" or select each of the regions 212 and associated destinations.

In some embodiments, the gesture-based user interface 124 provides a hierarchy of destinations. For example, one corner of the display 112 may be associated with email contacts, and the user may specify a particular email contact after the flick gesture. In such an embodiment, the gesture-based user interface 124 may display an additional set of labels once a particular region 212 has been selected, and the user may perform another flick gesture to choose a particular email address.

Figure 2G:
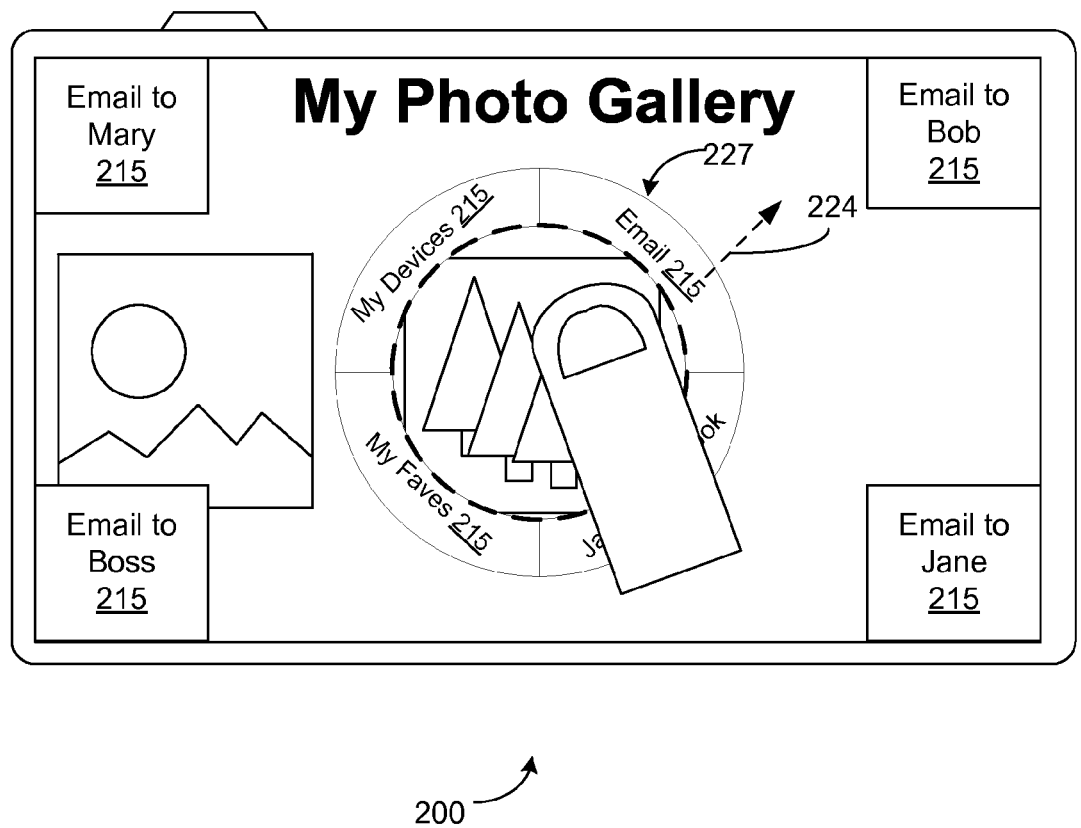

FIG. 2G shows an example of an additional set of labels for a second level of destinations. In this embodiment, as in the one shown in FIG. 2F, the gesture-based user interface 124 displays a circular arrangement 218 of labels when the user has designated a content item 203. In the scenario of FIG. 2G, the user drags the designated content item 203 in the direction 224 of a particular label, here, the email label 227. In doing so, the user's drag gesture crosses over "Email to Bob" 215. At this point, the gesture-based user interface 124 displays a set of labels 215 within each of the various regions 212. After crossing over the "Email to Bob" 215, the user then makes a flick gesture toward a specific region 212. Each label 215 includes text with the name of a specific email contact. In the embodiment of FIG. 2F, the regions 212 correspond to the edges of the screen, and are labeled: "Email to Bob"; "Email to Jane"; "Email to Mary"; and "Email to Boss."

Through the process described in connection with FIGS. 2A-F, the user sends a content item 203 to a predefined destination by first designating or selecting a content item 203, then performing a flick gesture that is associated with a predefined display region 212. The predefined regions 212 are in turn associated with predefined destinations. In some embodiments, the gesture-based user interface 124 may provide a confirmation when the designated content item 203 has been sent to the destination.

In the embodiments described above, the user designates an entire content item 203 for delivery to a predefined destination. In other embodiments, the user may, as part of the designation process, select a portion of a content item 203 for delivery to a predefined destination. For example, the user may select a portion of a document or network page, or a portion of an image, or a segment of a video or audio file. The partial designation process allows a user to easily share a few lines from an article on a network page to his friends via a post on a social networking site. The features described in connection with FIGS. 2A-2F also apply to partial selection embodiments.

Figure 3:
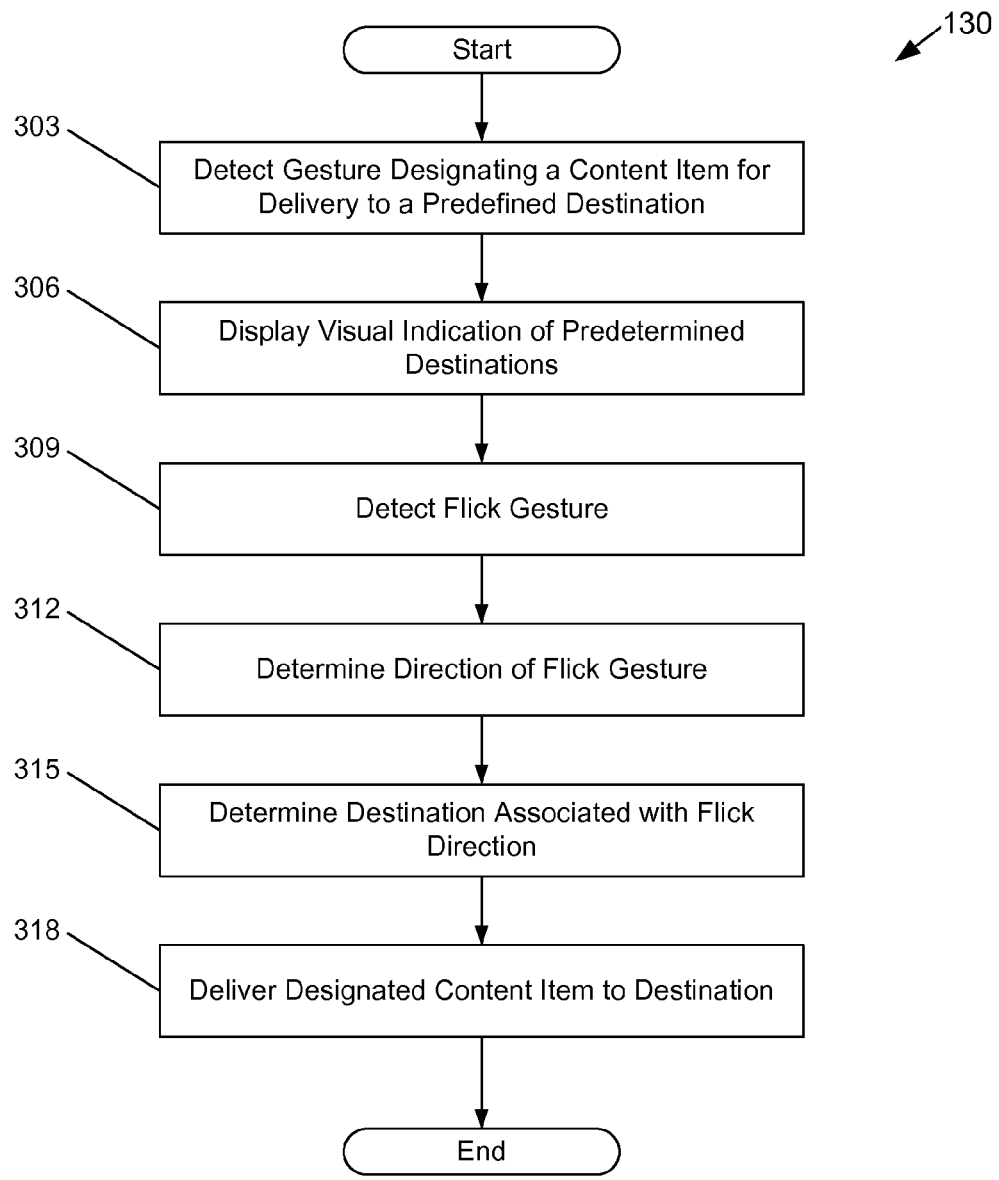
FIG. 3 is a flowchart illustrating an example of functionality implemented as portions of a gestured-based user interface executed in a computing device employed in the networked environment of FIG. 1 according to various embodiments of the present disclosure.

Turning now to FIG. 3, shown is a flowchart that provides one example of the operation of portion(s) of the gesture-based user interface 124 according to various embodiments. It is understood that the flowchart of FIG. 3 provides merely an example of the many different types of functional arrangements that may be employed to implement the operation of portion(s) of the gesture-based user interface 124 as described herein. As an alternative, the flowchart of FIG. 3 may be viewed as depicting an example of steps of a method implemented in the computing device 103 (FIG. 1) according to one or more embodiments.

Beginning at box 303, the gesture-based user interface 124 detects a user gesture designating a content item 203 (FIGS. 2A-2B) for delivery to a predefined destination. The designation may correspond to a generic selection of an item for any purpose, or may be a designation that is specific to delivery to a predefined destination. For example, if the gesture-based user interface 124 uses a single tap for generic selection, a double tap may be used to designate delivery to a designation. The gesture-based user interface 124 may utilize any type of gesture for this designation as may be appreciated.

In detecting the designation gesture, the gesture-based user interface 124 may receive various events from the operating system 121, and then process those events to detect different types of gestures. The events may be low-level events such as touches from which the gesture-based user interface 124 can detect types of gestures, or may be higher-level events which represent entire gestures.

At box 306, the gesture-based user interface 124 displays a visual representation of the predefined destinations, in conjunction with the regions 212 of the display 112. Several examples of such a visual representation were discussed earlier, including labels appearing within the regions 212 and labels appearing around the point of origin 206.

Next, at box 309, the gesture-based user interface 124 detects a flick gesture, described by a point of origin 206 and movement 209. The movement 209 may be represented as a track or series of points, a vector, an endpoint, or some combination thereof, as well as other types of representations as should be appreciated. The description of the flick gesture may also include a velocity of the gesture movement or acceleration of the gesture movement.

At box 312, the gesture-based user interface 124 processes the movement 209 information contained in the flick gesture to determine which region 212 of the display 112 that the user has gestured toward. For example, if the regions 212 correspond to the corners of the display 112, the gesture-based user interface 124 may correlate any movement toward the top left quadrant of the display 112 with the top left corner region 212. Similarly, if the regions 212 correspond to the edges of the display 112, the gesture-based user interface 124 may correlate any movement toward the top left quadrant of the display 112 with the top edge region 212.

Next, at box 315, the gesture-based user interface 124 determines which of the set of predefined destinations is associated with the region 212 identified in box 312. This association may be retrieved from the gesture mapping data 136. As noted above, the user may configure the gesture-based user interface 124 to specify these destinations and the association between destinations and regions 212.

Once a destination is identified, at box 318, the gesture-based user interface 124 takes action to deliver the designated content item 203 to the identified destination. The gesture-based user interface 124 may include code to deliver the content to some types of destinations, but may also invoke an application 118 executing on the computing device 103 to deliver other types of content. For example, the gesture-based user interface 124 may deliver a file to a locally stored folder or deliver a text message to a phone number contact, while relying on an email application 118 to send a message to a destination that is specified as an email address.

The specifics of the action depend on the type of destination. For example, if the destination is an email contact, the gesture-based user interface 124 may communicate with an email application 118 executing on the computing device 103 in order to create an email message addressed to the contact, insert the content item 203 into the message, and send the message. Depending on the type of content item 203, the item may be inserted inline into the message, or may be attached to the message. As another example, if the destination is a social networking site, the gesture-based user interface 124 may log in to the site (using information stored in the gesture mapping data 136) and create a post on the site that includes the content item 203. As yet another example, if the destination is another computing device 103, the gesture-based user interface 124 may initiate communications with the other computing device 103 and then transfer the content item 203 using a network protocol. During this communication process, the gesture-based user interface 124 may provide the other computing device 103 with credentials that identify the user, where these credentials may be stored in the gesture mapping data 136.

The embodiments discussed above involve delivering a single content item 203 to a predefined destination. Other embodiments of the gesture-based user interface 124 allow a user, through gesturing, to accumulate or aggregate content items 203 in a clipboard associated with a region 212 of the display 112. The user may label these clipboards and associate the clipboards with regions 212 via a configuration interface, where the gesture-based user interface 124 stores these settings as configuration data 142.

After the accumulation is complete, the user interacts with an application 118 to set up delivery of the accumulated content to a destination. For example, the user may execute a browser application 118 to log in to a friend's social networking page. At this point, the user performs a gesture which instructs the gesture-based user interface 124 to insert all of the aggregated content items 203 from the clipboard into the social networking page.

Figure 4A:
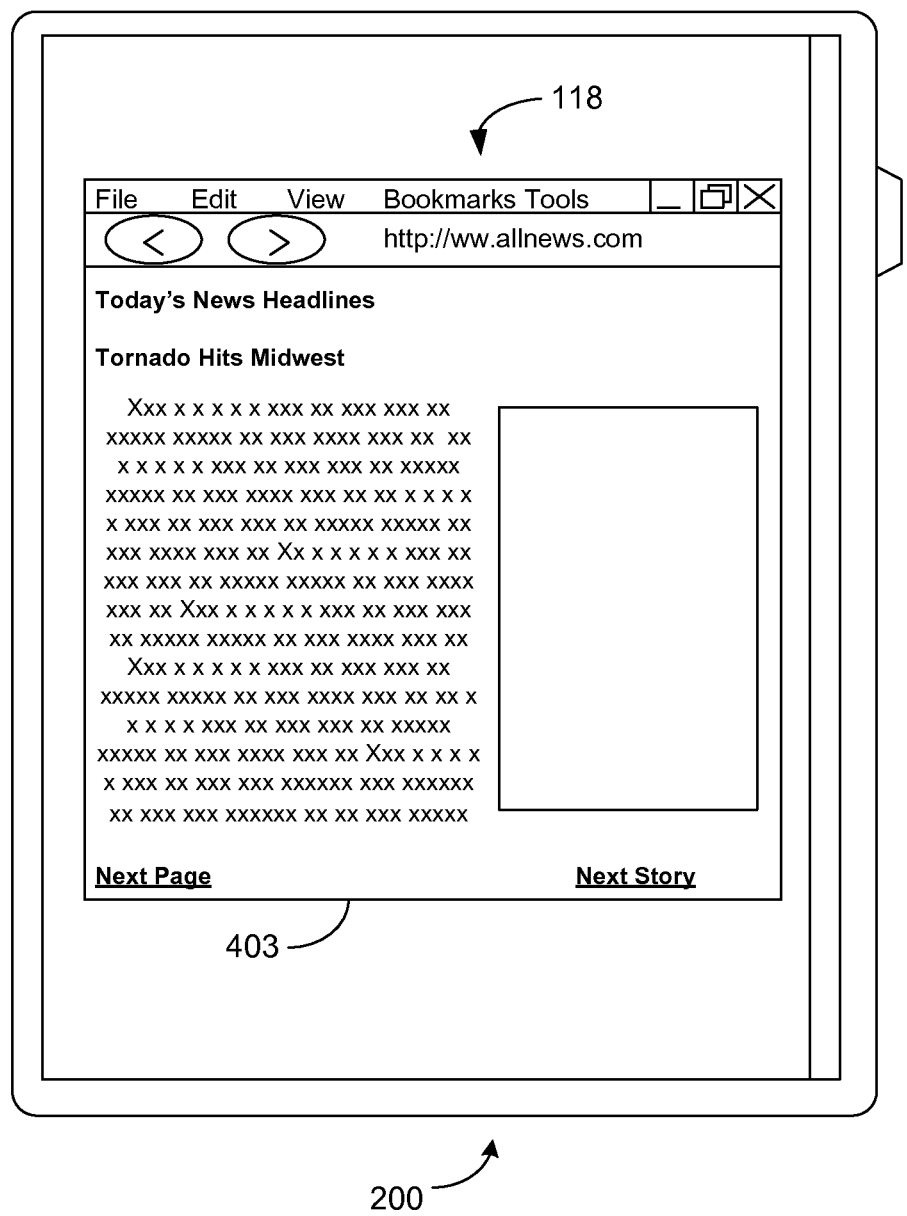
FIGS. 4A-4E are examples of a user interface displayed on a computing device employed in the networked environment of FIG. 1 according to various embodiments of the present disclosure.

FIGS. 4A-4F illustrate the process of accumulating content items 203, interacting with an application 118 to set up an object for content delivery to a destination, and causing the gesture-based user interface 124 to insert the accumulated content items 203 into the object for delivery to the identified destination. As shown in FIG. 4A, a user interacts with an application 118 (FIG. 1) through the gesture-based user interface 124 (FIG. 1) to view, browse, navigate, or otherwise interact with one or more content items 203. In the example of FIG. 4A, the content items 203 take the form of text and images shown on a network page 403, after rendering by a browser application 118 (FIG. 1).

Figure 4B:
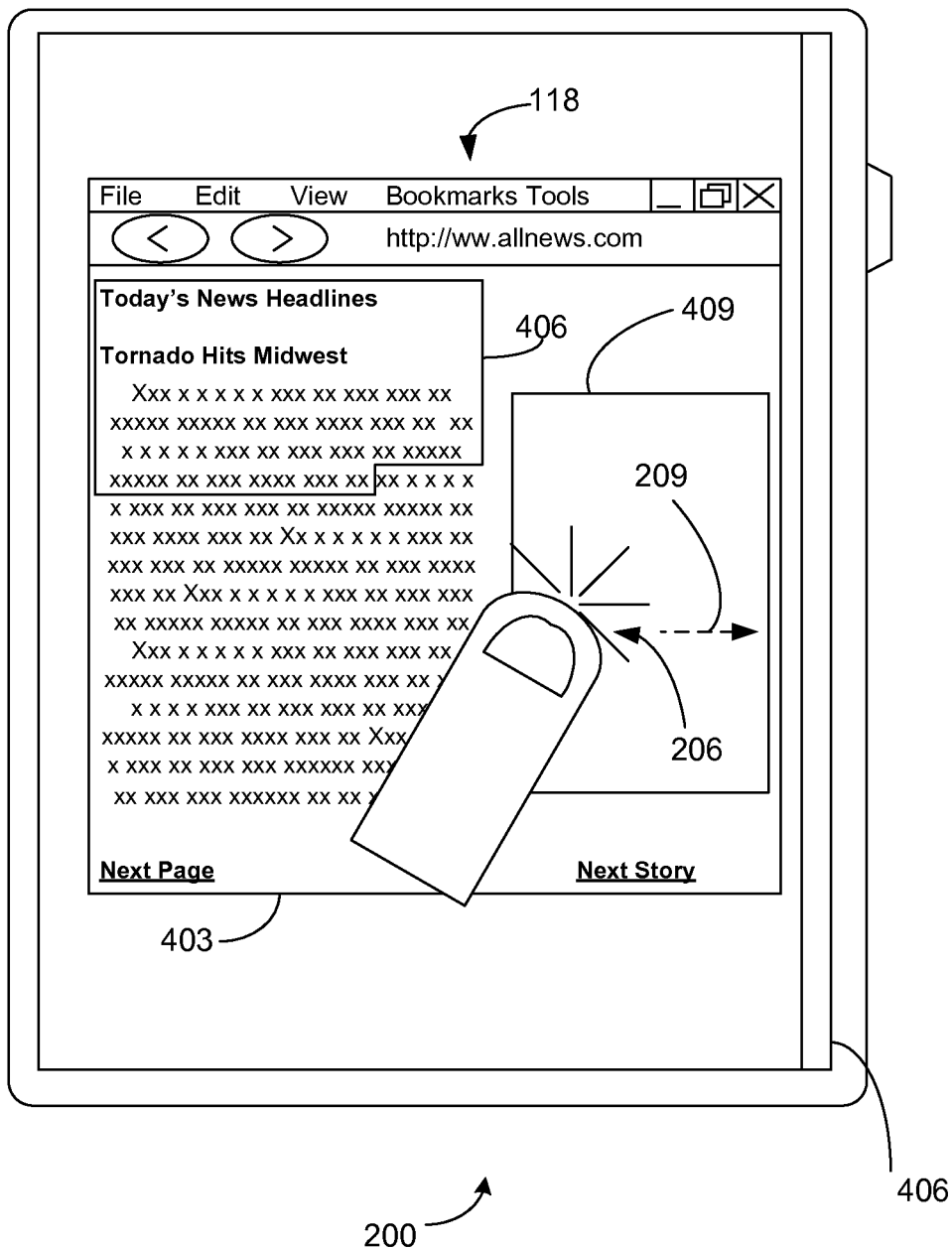

With reference now to FIG. 4B, the user then selects content items 203 and/or portions of content items 203. In this example, the user has selected a few lines of text 406 and an image 409. Having selected one or more items, the user performs a flick gesture in a region which includes selected content items 203. The flick gesture instructs the gesture-based user interface 124 to add the selected content items 203 to a clipboard associated with the flick gesture. As discussed above, the flick gesture includes a point of origin 206 and movement 209 in a direction of a region 212 of the display 112. The gesture-based user interface 124 manages one or more clipboards, each associated with a region 212. A flick gesture in the direction of a region 212 instructs the gesture-based user interface 124 to add the selected content item 203 to the clipboard associated with that region 212.

The gesture-based user interface 124 may provide a visual or audio indication that content items 203 and/or portions of content items 203 are being accumulated at a particular region 212. For example, the gesture-based user interface 124 may use color, transparency, highlighting, or other types of cues in the region 212. The visual indication may include a label which distinguishes the clipboards and the regions 212, for example, a name for the clipboard given by the user.

Figure 4C:
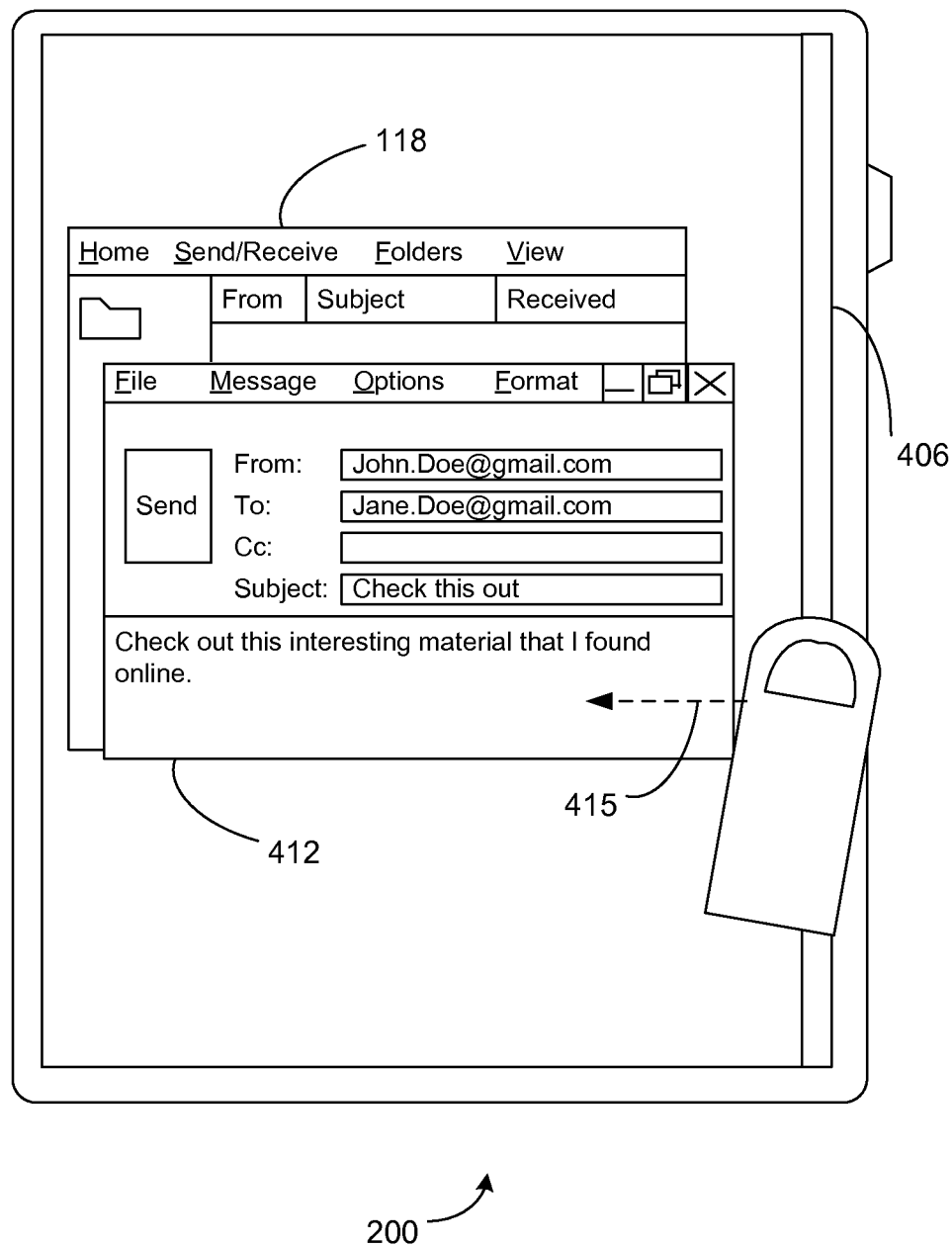

Turning now to FIG. 4C, having accumulated one or more content items 203, the user then interacts with an application 118 to set up an object to deliver content to a destination. This application 118 may be the same as the one from which content was accumulated, or may be a different one. In this example, the application 118 used to deliver the accumulated content is an email application 118. The user interacts with the application 118 to create a message 412 and address it to a contact. At this point, the user performs an insert gesture 415 which instructs the gesture-based user interface 124 to insert all of the aggregated content items 203 from a particular clipboard into the message 412. As one example, the insert gesture 415 may be a swipe from the region 212 associated with the clipboard toward a location of the application 118. In some embodiments, the insert gesture 415 also causes the gesture-based user interface 124 to stop accumulating. In other embodiments, a separate action or gesture is used to stop accumulation.

Figure 4D:
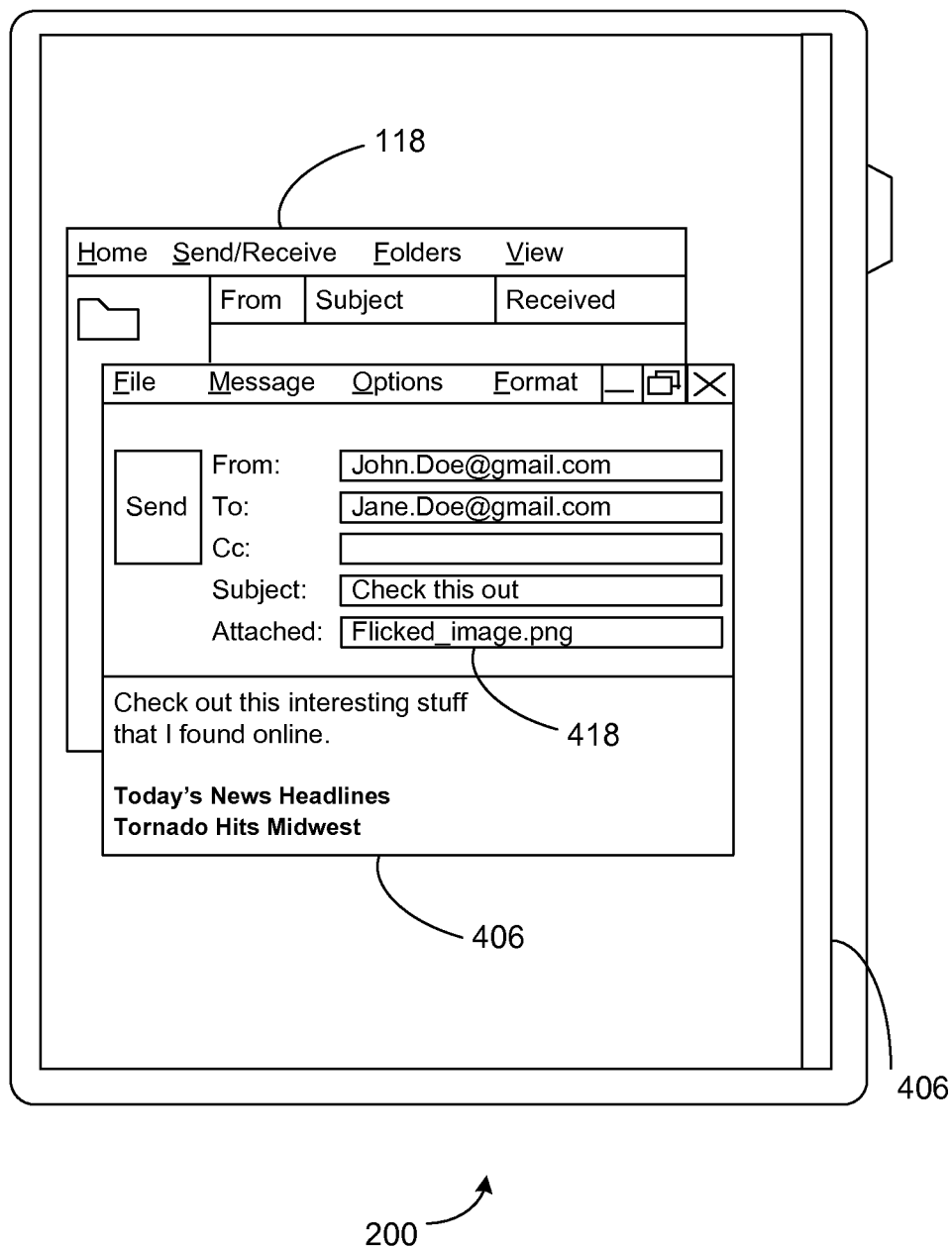

As shown in FIG. 4D, in response to an insert gesture 415, the gesture-based user interface 124 interoperates with the application 118 to insert into the email message 412 all of the aggregated content items 203 from the clipboard associated with the insert gesture 415. The gesture-based user interface 124 may utilize, for example, an application programming interface (API) provided by the application 118 or by the operating system 121 (e.g., an Insert_From_Clipboard function). In this example, the selected lines of text 406 are inserted in the body of the message 412 and the selected image 409 is inserted as an attachment 418. The insertion type may be a configuration option, may depend on the location of the insert gesture 415, or may depend on the type of the content items 203, or some combination thereof.

The embodiment shown in FIG. 4D, an insert gesture 415 operates to insert all the content items 203 from a particular clipboard. Other embodiments allow the user to select one or more particular content items 203 from a clipboard after performing an insert gesture 415. An example of such an embodiment is shown in FIG. 4E.

Figure 4E:
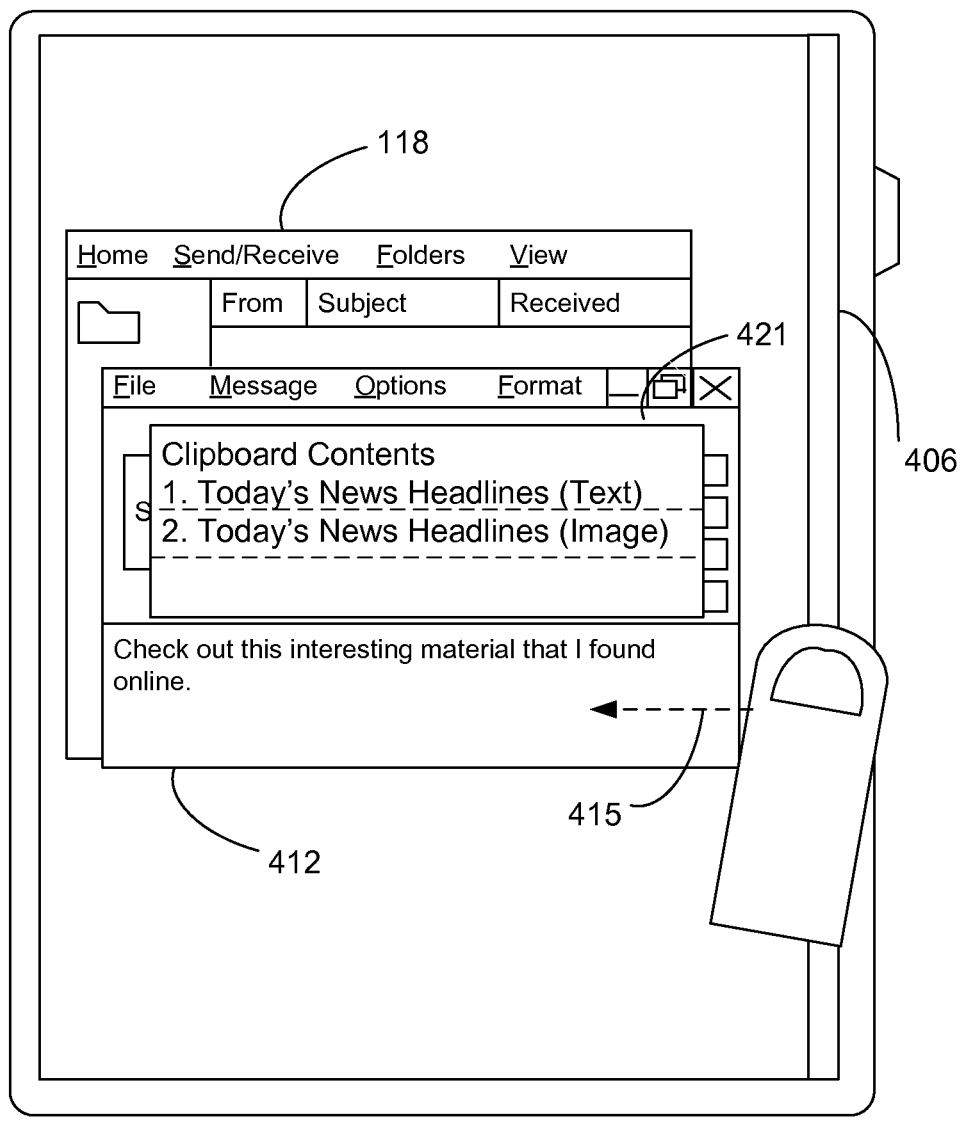

As can be seen in FIG. 4E, the user interacts with the application 118 to create a message 412 and address it to a contact, then performs an insert gesture 415. In this embodiment, the gesture-based user interface 124 causes a clipboard viewer 421 to be displayed. The clipboard viewer includes a list of the content items 203 that are currently stored in the clipboard associated with the insert gesture 415. The user then selects one or more of the content items 203 from the clipboard viewer 421, and in response, the gesture-based user interface 124 interoperates with the application 118 to insert into the email message 412 the selected content item(s) 203 from the clipboard.

In some embodiments, multiple clipboards may be in use at one time. For example, a user may use the right side of the display 112 as a clipboard for the user's own Twitter® account, and the left side of the display 112 as a clipboard for a friend's Facebook® page. As the user interacts with content by performing activities such as browsing network pages, reading email, and viewing locally stored documents, the user may accumulate content items 203 to the two clipboards. The user may then navigate to his account on the Twitter® site and swipe from the right off-screen area to the Twitter® network page, which will insert accumulated content items 203 stored in the Twitter® clipboard. Similarly, the user may navigate to his friend's account on the Facebook® site and swipe from the right off-screen area to the Facebook® network page, which will insert accumulated content items 203 stored in the Facebook® clipboard.

Figure 5:
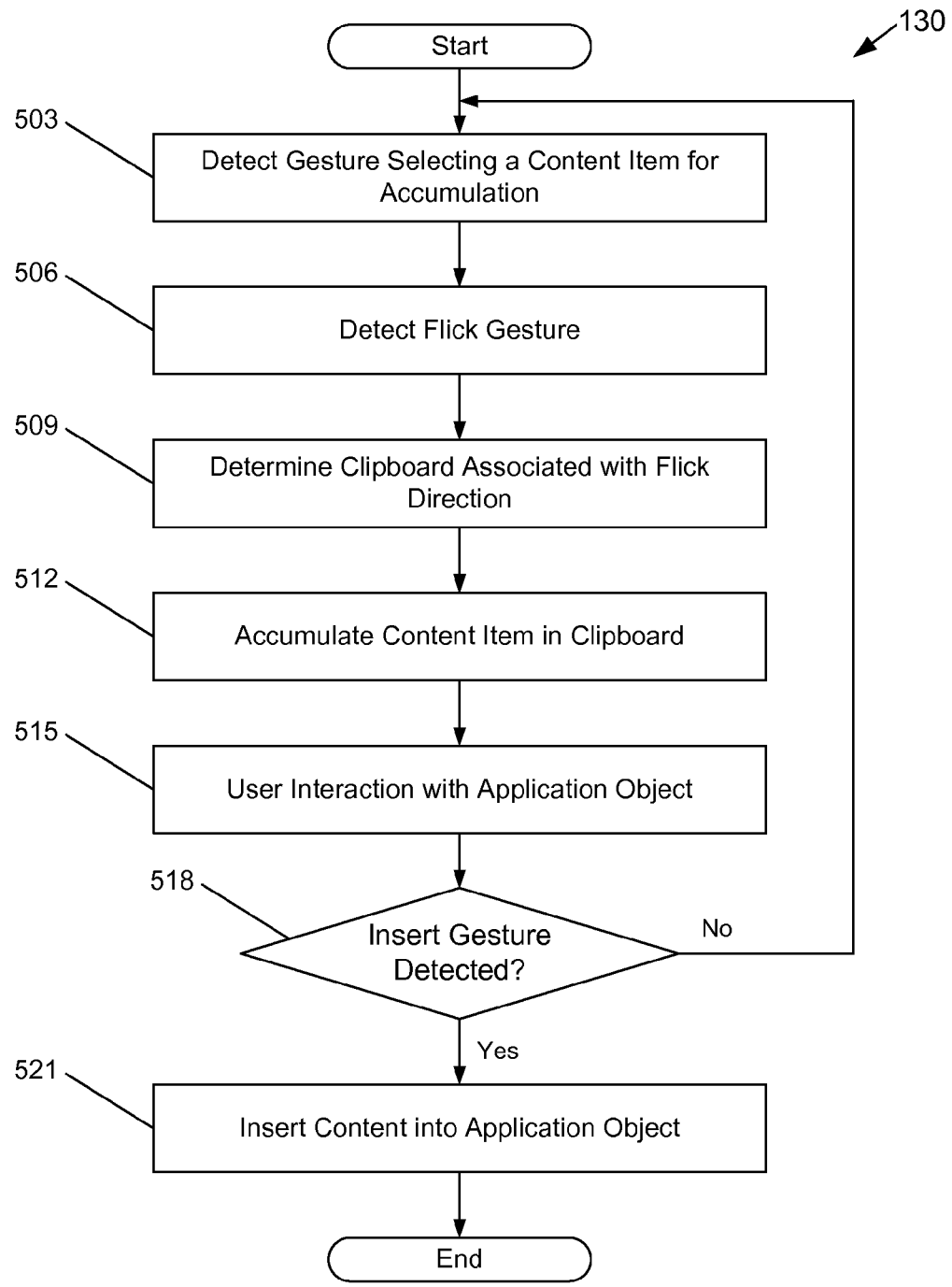
FIG. 5 is a flowchart illustrating an example of functionality implemented as portions of a gestured-based user interface executed in a computing device employed in the networked environment of FIG. 1 according to various embodiments of the present disclosure.

Turning now to FIG. 5, shown is a flowchart that provides one example of the operation of portion(s) of the gesture-based user interface 124 according to various embodiments. It is understood that the flowchart of FIG. 5 provides merely an example of the many different types of functional arrangements that may be employed to implement the operation of portion(s) of the gesture-based user interface 124 as described herein. As an alternative, the flowchart of FIG. 5 may be viewed as depicting an example of steps of a method implemented in the computing device 103 (FIG. 1) according to one or more embodiments.

Beginning at box 503, the gesture-based user interface 124 detects a user gesture selecting a content item 203 (FIGS. 2A-2F) for accumulation to a particular clipboard. In detecting the selection gesture, the gesture-based user interface 124 may receive various events from the operating system 121, and then process those events to detect different types of gestures. The events may be low-level events such as touches from which the gesture-based user interface 124 can detect types of gestures, or may be higher-level events which represent entire gestures.

Next, at box 506, the gesture-based user interface 124 detects a flick gesture, described by a point of origin 206 and movement 209 (FIG. 4B). The movement 209 may be represented as a track or series of points, a vector, an endpoint, or some combination thereof, as well as other types of representations as should be appreciated. The description of the flick gesture may also include a velocity of the gesture movement or acceleration of the gesture movement.

At box 509, the gesture-based user interface 124 processes the movement 209 information contained in the flick gesture to determine which region 212 of the display 112 that the user has gestured toward. For example, if the regions 212 correspond to the corners of the display 112, the gesture-based user interface 124 may correlate any movement toward the top left quadrant of the display 112 with the top left corner region 212. Similarly, if the regions 212 correspond to the edges of the display 112, the gesture-based user interface 124 may correlate any movement toward the top left quadrant of the display 112 with the top edge region 212. Having determined the region 212, the gesture-based user interface 124 determines which of the set of predefined clipboards is associated with the region 212. This association may be retrieved from the gesture mapping data 136. As noted above, the user may configure the gesture-based user interface 124 to associate clipboards with regions 212 and to label or name the clipboards.

Having identified a clipboard, at box 512 the gesture-based user interface 124 adds the selected content item 203 to the clipboard. Next, at box 515, the user interacts with one or more applications 118 and objects maintained by those applications 118, in order to set up delivery of the accumulated content items 203 to the identified destination. For example, the user may open up a document in a word processing application 118, use an email application 118 to create and address an email message, or may use a browser application 118 to navigate through pages on a network site.

At box 518, the gesture-based user interface 124 looks for an insert gesture 415. If no insert gesture 415 is detected, then processing continues at box 503. Thus, this process of selecting content items 203, flicking the items to a clipboard for accumulation, and interacting with applications 118 continues until an insert gesture 415 is detected. Upon such detection, processing continues at box 521.

At box 521, the gesture-based user interface 124 determines, from the insert gesture 415, which clipboard the user intends to use as a source of accumulated content, and which application 118 the user intends as a destination for the accumulated content. The gesture-based user interface 124 may use, for example, the origin of the gesture to determine the clipboard and the direction of the gesture to determine the application 118. Then gesture-based user interface 124 then interacts with this application 118 to cause the accumulated content items 203 from the particular clipboard to be inserted into the particular application object. The nature of such interactions will depend on the type of application and content as may be appreciated. The process of FIG. 5 is then complete.

In the embodiment described in connection with FIG. 5, the gesture-based user interface 124 responds to an insert gesture 415 at box 521 by inserting all aggregated content items 203 into the application object. For some embodiments which allow the user to select particular content items 203 for insertion, the functionality of box 521 is expanded, as will now be described in connection with FIG. 6.

Figure 6:
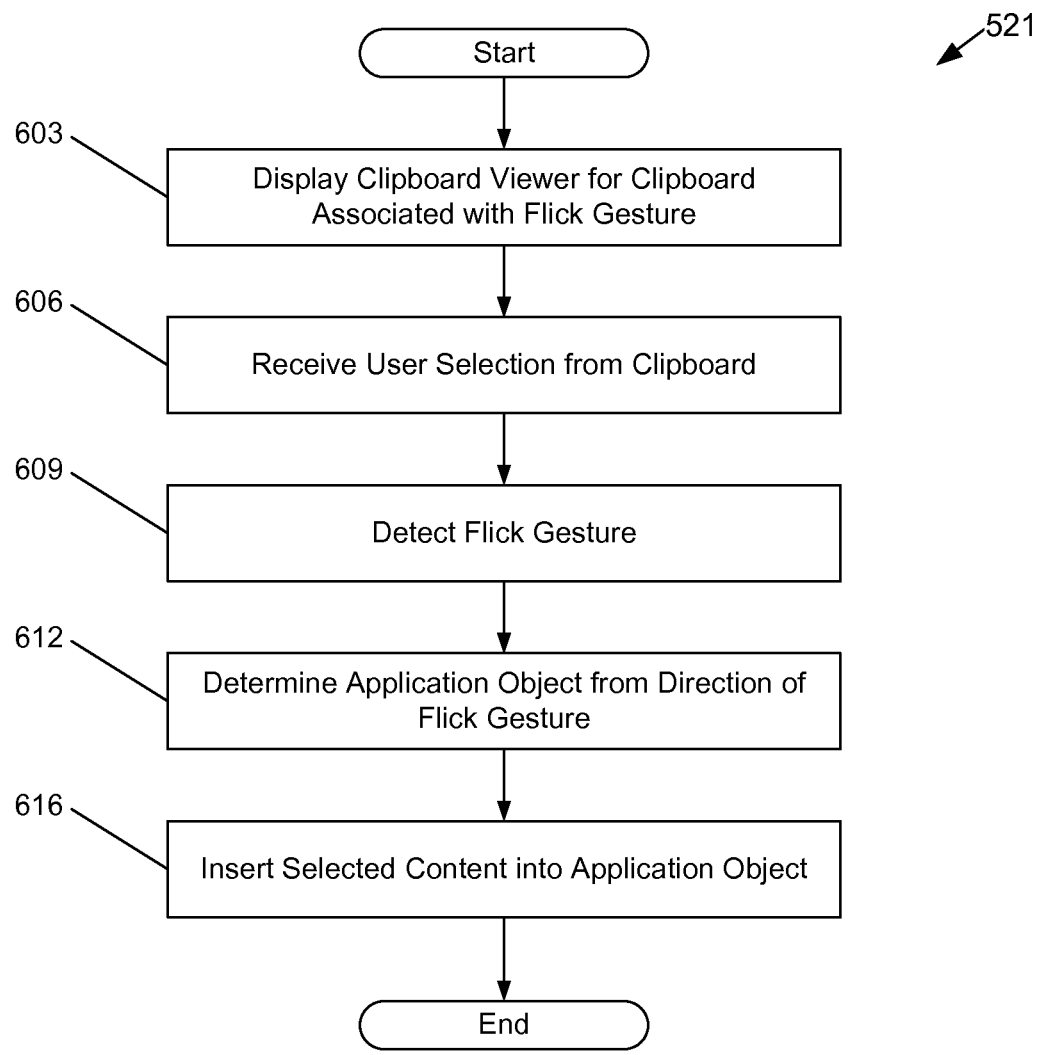
FIG. 6 is a flowchart illustrating another example of functionality implemented as portions of a gestured-based user interface executed in a computing device employed in the networked environment of FIG. 1 according to various embodiments of the present disclosure.

Turning now to FIG. 6, shown is a flowchart that provides one example of the operation of portion(s) of the gesture-based user interface 124 according to various embodiments. In particular, the flowchart of FIG. 6 describes, in more detail, the functionality of box 521 in FIG. 5. It is understood that the flowchart of FIG. 6 provides merely an example of the many different types of functional arrangements that may be employed to implement the operation of portion(s) of the gesture-based user interface 124 as described herein. As an alternative, the flowchart of FIG. 6 may be viewed as depicting an example of steps of a method implemented in the computing device 103 (FIG. 1) according to one or more embodiments.

The process of FIG. 6 begins after a flick gesture and then an insert gesture 421 are detected. Beginning at box 603, the gesture-based user interface 124 displays, in a clipboard viewer 421, the accumulated contents of the clipboard that is associated with the insert gesture 421. At box 606, the gesture-based user interface 124 receives a user selection of one or more content items 203 from the clipboard. Next, at box 609, the user interface 124 waits for another flick gesture. At box 612, the user interface 124 determines, from the direction of the flick gesture, a particular application object for insertion. For example, a flick toward an email message indicates insertion into that email message, while a flick toward a folder indications insertion into that folder. Finally, at box 615, the gesture-based user interface 124 interacts with this application 118 to cause the selected content items 203 from the clipboard to be inserted into the application object specified by the flick gesture that was detected at box 609.

Turning now to FIG. 6, shown is a schematic block diagram of the computing device 103 according to an embodiment of the present disclosure. The computing device 103 includes at least one processor circuit, for example, having a processor 703 and a memory 706, both of which are coupled to a local interface 709. The local interface 709 may comprise, for example, a data bus with an accompanying address/control bus or other bus structure as can be appreciated. Also coupled to the local interface 709 are the gesture input device 115 and the display 112 (discussed earlier in connection with FIG. 1). A display 112 and a gesture input device 115 are also attached to, coupled to, or integrated with the computing device 103. In some embodiments, the computing device 103 also includes a network interface (not shown).

Figure 7:
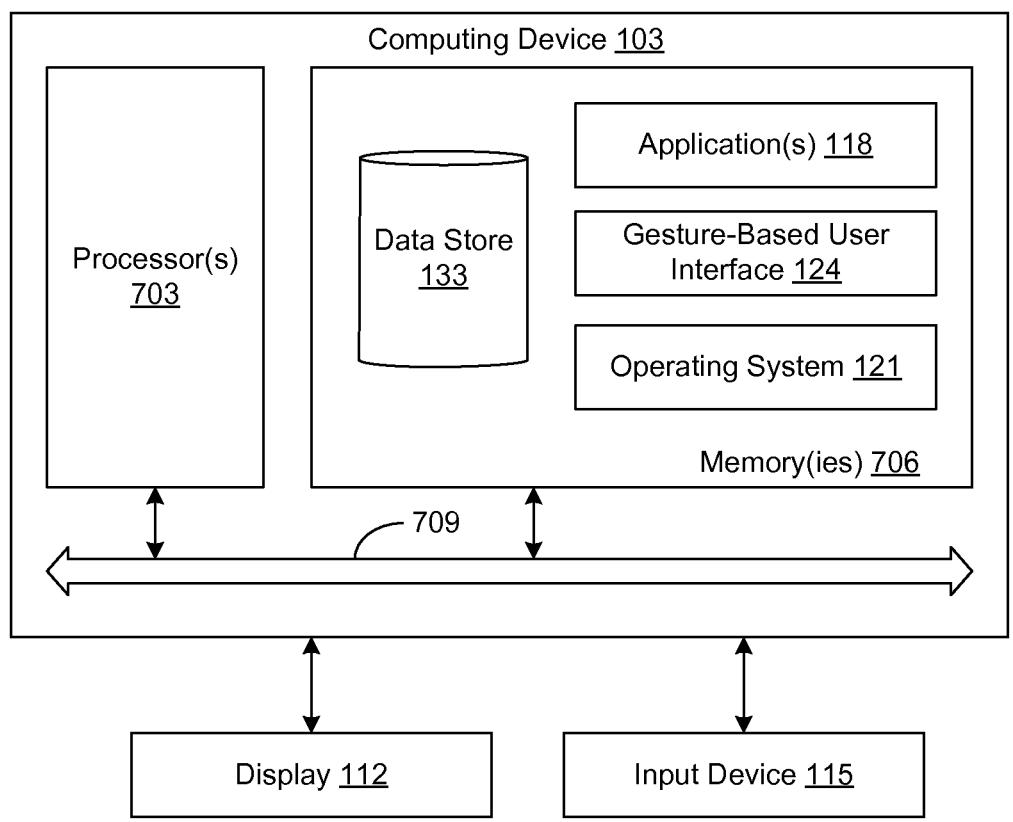
FIG. 7 is a schematic block diagram that provides one example illustration of a computing device employed in the networked environment of FIG. 1 according to various embodiments of the present disclosure.

Stored in the memory 706 are both data and several components that are executable by the processor 703. In particular, stored in the memory 706 and executable by the processor 703 are the applications 118, the operating system 121, and the gesture-based user interface 124. Other components may also be stored in the memory 706 and executable by the processor 703. While not illustrated, the computing device 106 (FIG. 1) also includes components like those shown in FIG. 7.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and executed by the processor 703, source code that may be expressed in proper format such as object code that is capable of being loaded into a random access portion of the memory 706 and executed by the processor 703, or source code that may be interpreted by another executable program to generate instructions in a random access portion of the memory 706 and executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors and the memory 706 may represent multiple memories that operate in parallel processing circuits, respectively. In such a case, the local interface 709 may be an appropriate network 109 (FIG. 1) that facilitates communication between any two of the multiple processors 703, between any of the processors 703 and any of the memories 706, or between any two of the memories 706, etc. The local interface 709 may comprise additional systems designed to coordinate this communication, including, for example, performing load balancing. The processor 703 may be of electrical or of some other available construction.

Although the applications 118, the operating system 121, and the gesture-based user interface 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 3, FIG. 5, and FIG. 6 show the functionality and operation of an implementation of portions of the gesture-based user interface 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 703 in a computer system or other system. The machine code may be converted from the source code, etc. If embodied in hardware, each block may represent a circuit or a number of interconnected circuits to implement the specified logical function(s).

Although the flowcharts of FIG. 3, FIG. 5, and FIG. 6 show a specific order of execution, it is understood that the order of execution may differ from that which is depicted. For example, the order of execution of two or more blocks may be scrambled relative to the order shown. Also, two or more blocks shown in succession in the flowcharts of FIG. 3, FIG. 5, and FIG. 6 may be executed concurrently or with partial concurrence. Further, in some embodiments, one or more of the blocks shown in FIG. 3, FIG. 5, and FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein (including the applications 118, the operating system 121, and the gesture-based user interface 124) that comprises software or code can be embodied in any non-transitory computer-readable medium for use by or in connection with an instruction execution system such as, for example, the processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying computer-readable program instructions stored thereon that, when executed in a computing device, direct the computing device to at least:
   detect a selection of a document via a touchscreen;
   display, in response to the selection of the document, a plurality of regions and predetermined labels on the touchscreen, the plurality of regions being associated with a plurality of predefined destinations;
   detect a first flick gesture via the touchscreen;
   determine a particular destination from among the plurality of predefined destinations based on the first flick gesture;
   add the document to a clipboard associated with the particular destination in response to the first flick gesture;
   detect a second flick gesture via the touchscreen; and
   deliver the document from the clipboard to an application associated with the particular destination in response to the second flick gesture.

2. The non-transitory computer-readable medium of claim 1, wherein the plurality of predefined destinations are associated with a plurality of applications.

3. A method, comprising:
    detecting, by at least one computing device, a designation of a content item;
    detecting, by the at least one computing device, a first flick gesture extending from a point of origin based at least in part on the first flick gesture crossing a trip line which surrounds the point of origin;
    identifying, by the at least one computing device, a particular destination associated with the flick gesture from among a plurality of predefined destinations, the plurality of predefined destinations being associated with a plurality of regions on a display of the at least one computing device;
    adding, by the at least one computing device, the content item to a clipboard associated with the particular destination in response to the first flick gesture;
    detecting, by the at least one computing device, a second flick gesture; and
    delivering, by the at least one computing device, the content item from the clipboard to an application associated with the particular destination in response to the second flick gesture.

4. The method of claim 3, wherein the first flick gesture includes a direction with respect to the display and wherein the identifying is based at least in part on the direction of the first flick gesture.

5. The method of claim 4, wherein the identifying further comprises:
    determining which one of the plurality of regions on the display is associated with the direction of the first flick gesture; and
    determining the particular destination based at least in part on the one of the plurality of regions.

6. The method of claim 3, further comprising displaying a predetermined label at each of the plurality of regions.

7. The method of claim 3, further comprising displaying an arrangement of a plurality of predetermined labels corresponding to the plurality of predefined destinations.

8. The method of claim 7, wherein the arrangement of the predetermined labels is circular.

9. The method of claim 3, further comprising displaying a visual indication of the designation of the content item.

10. The method of claim 3, wherein:
    the designation of a content item comprises the designation of a plurality of content items; and
    the adding comprises adding the plurality of content items to the clipboard associated with the particular destination in response to the first flick gesture.

11. The method of claim 10, wherein the delivering comprises delivering the plurality of content items from the clipboard to the application associated with the particular destination in response to the second flick gesture.

12. The method of claim 3, wherein the content item is a file, the application associated with the particular destination is an email application executable in the at least one computing device, and the delivering further comprises attaching the file to an email message.

13. The method of claim 3, wherein the delivering further comprises interacting, via an application programming interface, with the application associated with the particular destination to deliver the content item.

14. A system, comprising:
    at least one computing device including a memory;
    an input device;
    a display; and
    a user interface comprising computer-readable instructions stored on the memory that, when executed in the at least one computing device, direct the at least one computing device to at least:
        detect a selection of at least a portion of a content item via the input device;
        display, in response to the selection, a plurality of regions and predetermined labels on the display, the plurality of regions being associated with a plurality of predefined destinations;
        detect a first gesture via the input device after the selection;
        identify a particular destination from among the plurality of predefined destinations based at least in part upon the first gesture, the plurality of predefined destinations being associated with a plurality of regions on the display;
        add the at least a portion of the content item to a clipboard associated with the particular destination in response to the first gesture;
        detect a second gesture via the input device; and
        deliver the at least a portion of the content item from the clipboard to an application associated with the particular destination in response to the second gesture.

15. The system of claim 14, wherein the plurality of regions correspond to a plurality of edges of the display.

16. The system of claim 14, wherein the display comprises a three-dimensional display.

17. The system of claim 16, wherein the plurality of regions comprise a three-dimensional grid.

18. The system of claim 17, wherein the at least one computing device is further directed to account for a friction characteristic associated with the display according to at least one of velocity or acceleration.

19. The system of claim 14, wherein the at least one computing device is further directed to display a visual indication of the plurality of predefined destinations.

20. The system of claim 14, wherein the content item is a file, the particular destination is a network site, and the at least one computing device is further configured to post the at least a portion of the content item to the network site.

21. The system of claim 14, wherein the content item is a file, the application associated with the particular destination is an email application executing in the at least one computing device, and the at least one computing device is further configured to create an email message including the at least a portion of the content item.

22. The system of claim 14, wherein the content item is a file, the particular destination is an email address, and the at least one computing device is further configured to attach the at least a portion of the content item to an email address.

* * * * *